US011892810B1

(12) United States Patent
Capecelatro et al.

(10) Patent No.: US 11,892,810 B1
(45) Date of Patent: Feb. 6, 2024

(54) CONTEXTUAL HOME AUTOMATION TOGGLE

(71) Applicant: Josh.ai, Inc., Denver, CO (US)

(72) Inventors: Alex Nathan Capecelatro, Los Angeles, CA (US); Brian Hulme, Morrison, CO (US); Timothy Earl Gill, Denver, CO (US)

(73) Assignee: Josh.ai, Inc., Denver, CO (US)

( * ) Notice: Subject to any disclaimer, the term of this patent is extended or adjusted under 35 U.S.C. 154(b) by 903 days.

(21) Appl. No.: 16/850,351

(22) Filed: Apr. 16, 2020

Related U.S. Application Data

(60) Provisional application No. 62/837,583, filed on Apr. 23, 2019.

(51) Int. Cl.
*G05B 15/02* (2006.01)
*H04R 1/08* (2006.01)
*G05G 1/02* (2006.01)
*G05G 5/05* (2006.01)
*G05G 1/04* (2006.01)

(52) U.S. Cl.
CPC ............... *G05B 15/02* (2013.01); *G05G 1/02* (2013.01); *G05G 1/04* (2013.01); *G05G 5/05* (2013.01); *H04R 1/08* (2013.01); *G05G 2505/00* (2013.01)

(58) Field of Classification Search
CPC . G05B 15/02; G05G 1/02; G05G 1/04; G05G 5/05; G05G 2505/00; H04R 1/08
See application file for complete search history.

(56) References Cited

U.S. PATENT DOCUMENTS

| | | | | |
|---|---|---|---|---|
| 2014/0214189 A1* | 7/2014 | Goodwin | ............... | H04H 60/04 700/94 |
| 2017/0188437 A1* | 6/2017 | Banta | ...................... | G10L 15/00 |
| 2018/0303049 A1* | 10/2018 | Weiler | ................. | G05B 19/048 |

* cited by examiner

*Primary Examiner* — Yuhui R Pan
(74) *Attorney, Agent, or Firm* — Van Pelt, Yi & James LLP (57) ABSTRACT

A first input associated with an audio input from within a physical environment and an indication that a manual input device has been moved to a first operative position of the manual input device is received. The first input is mapped to a building automation control context. A controlled subsystem is caused to be operated in a manner associated with the first operative position and the building automation control context.

20 Claims, 7 Drawing Sheets

Gang Box System 204

Multicolor Ring 208b

Toggle 208a

Microphone Array 206

CONTEXTUAL HOME AUTOMATION TOGGLE

CROSS REFERENCE TO OTHER APPLICATIONS

This application claims priority to U.S. Provisional Patent Application No. 62/837,583 entitled CONTEXTUAL HOME AUTOMATION TOGGLE filed Apr. 23, 2019 which is incorporated herein by reference for all purposes.

BACKGROUND OF THE INVENTION

Technology advances have increased automation for products, devices, and systems, including automation in the home. Typically, a user may control said automation via using a physical static button like a button panel, light switch, using an app interface, or using natural language speech. There is a need to design and implement user interface devices that are simpler, more aesthetically appealing, and/or require less training to learn to control home automation.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A contextual home automation device is disclosed. The device comprises one or more audio input devices to input natural language phrases from a user to at least in part determine a current context for a physical interface. In one embodiment, the physical interface is a "toggle", referred to herein as any physical device that can alter a state associated with one or more home automation subsystems through one or more actions.

Examples of a toggle include a button, a latching button, a momentary button, a switch, a latching switch, a momentary switch, a rocker switch, a trigger switch, a paddle switch, a lever switch, a joystick switch, a 4-way switch, an 8-way switch, a two-position switch, a three-position switch, a multi-position switch, a return switch, a spring switch, a keylock switch, a dial, a keyboard, and/or a keypad. Other examples of a toggle include a single-pole single-throw (SPST) mechanism, a single-pole double-throw (SPDT) mechanism, a double-pole single-throw (DPST) mechanism, a double-pole double-throw (DPDT) mechanism, and/or any multi-pole multi-throw mechanism. In one embodiment, the toggle has a center position as the neutral position and is spring loaded to return to the neutral position as a "momentary" switch.

Examples of home automation subsystems include light control, dimmer control, color temperature control, color control, thermostat control, heating/ventilation/air conditioning (HVAC) setting control, camera control, speaker control, television control, volume control, channel control, set-top box control, switch control, open/close shade control, shade tilt control, fan speed control, fan rotation direction control, garage door control, lock control, pool heater control, sprinkler control, shower/bath temperature control, and/or floor heater control.

In one embodiment, the contextual home automation device uses input natural language phrases to determine a current context, for example "Josh, dim the lights" may be associated with a current context with a light dimmer toggle in a zone/room where the device is located. A visual indication may turn yellow to indicate "light dimmer control" and/or may indicate a percentage of brightness. The same user may subsequently utter "Josh, turn on CNN" which may be associated with a current context with a volume level of a television set in the same zone/room playing CNN to be toggled up and/or down. The visual indication may turn orange to indicate "television volume control" and/or may indicate a percentage of volume.

In one embodiment, a secondary system of context input is provided beyond the input natural language phrases, for example using a physical mechanism and/or an independent mechanism like an app interface. In one embodiment, the toggle may be user or factory set to default to controlling a home automation function like lighting when no current context or no recent context is input.

In one embodiment, the user may utter "Josh, turn on the television" which may be associated with a current context with a volume level of a television set in the same zone/room, and/or a channel setting of a television set in the same zone/room. In one embodiment, the toggle may be split to simultaneously control both volume, which may be indicated by orange, and channel, which may be indicated by purple. For example, if the toggle is a keypad, one or two keys may control volume and/or be lit orange, and one or two keys may control channel and/or be lit purple. In one embodiment, the toggle may be user or factory set to default to volume or channel without specific context beyond "turn on the television". In one embodiment, a zone/room may have a default current context without any user commands, for example volume of a television in a television room. In one embodiment, a user and/or system installer may set an associated zone/room of a device.

In one embodiment, the contextual home automation device also comprises one or more environmental sensors including motion sensors, temperature sensors, and light sensors. The sensors may assist the one or more audio input devices by waking or muting them, and/or may themselves determine a current context, for example if the temperature is above 80 degrees Fahrenheit, a visual indicator may turn blue to indicate "air conditioner control" and the user may assert a temperature set point with the toggle. Similarly, a light sensor may assist determining a current context based at least in part on light input, for example whether it is day or night.

Figure 1:
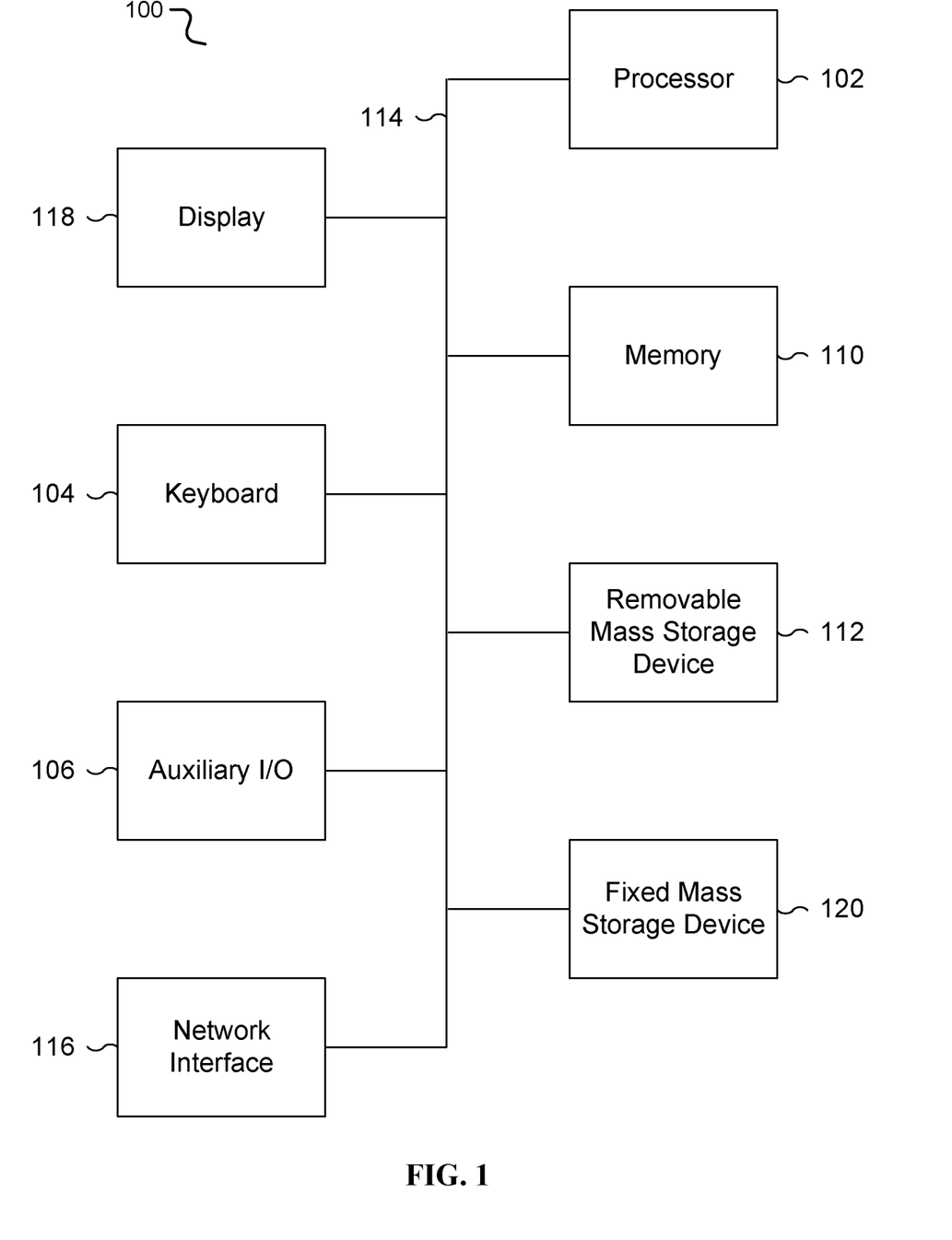
FIG. 1 is a functional diagram illustrating a programmed computer/server system for control of contextual input in accordance with some embodiments.

FIG. 1 is a functional diagram illustrating a programmed computer/server system for control of contextual input in accordance with some embodiments. As shown, FIG. 1 provides a functional diagram of a general purpose computer system programmed to provide contextual home automation in accordance with some embodiments. As will be apparent, other computer system architectures and configurations can be used for contextual home automation.

Computer system (100), which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system (100). Using instructions retrieved from memory (110), the processor (102) controls the reception and manipulation of input data, and the output and display of data on output devices, for example display and graphics processing unit (GPU) (118). In one embodiment, processor (102) is not a primary processor for the system, wherein the hardware includes a touch ring (106) that sends data to a cloud-based primary processor via a network interface (116).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system (100), and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system (100) to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system (100). The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems can also be utilized.

Figure 2:
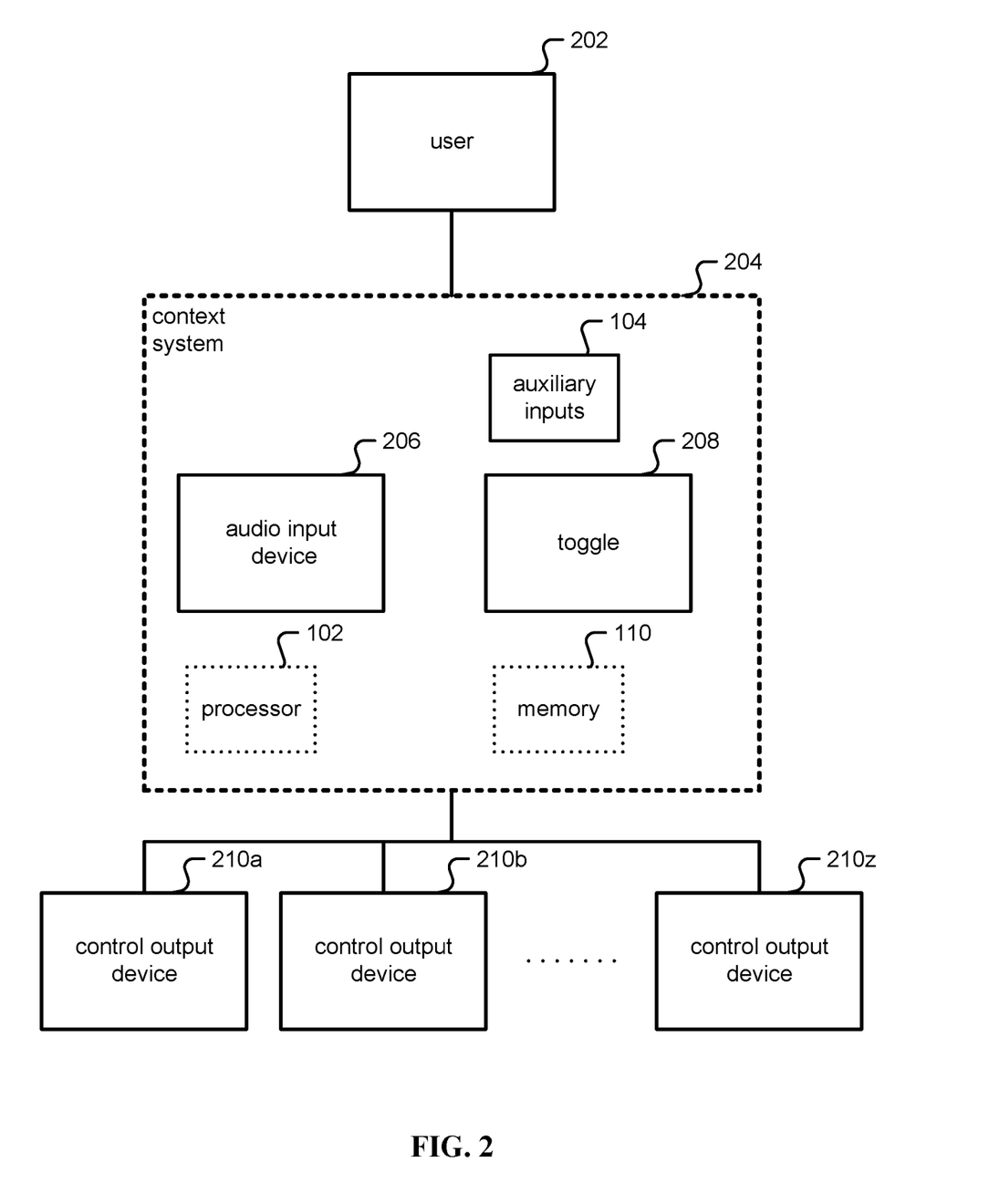
FIG. 2 is a block diagram illustrating an embodiment of a system for contextual home automation.

FIG. 2 is a block diagram illustrating an embodiment of a system for contextual home automation. User (202) is coupled to contextual home automation device (204), in some cases through an audio input device (206). In one embodiment, contextual home automation device (204) is a computer system as shown in FIG. 1 and includes optional processor (102) and optional memory (110). In one embodiment not shown in FIG. 2, the processor (102) and/or memory (110) are instead remotely located at a hub, such as a building automation hub, and connected by a network interface (116). In one embodiment, (optional) auxiliary inputs such as a motion sensor, a temperature sensor, a light sensor, a humidity sensor, and/or other sensors (104) are included to determine at least in part a current context and/or alter a state associated with a home automation subsystem based at least in part on the current context. Another auxiliary input not shown in FIG. 2 is an associated smartphone/tablet/computer app.

A physical control such as a toggle (208) is also part of device (204). After contextual input processing the toggle (208) controls one or more control output devices (210) association with a home automation subsystem, here shown with three devices (210a), (210b), and (210z). In one embodiment, the system (204) of FIG. 2 is mounted in an electrical box for wall/ceiling/floor mount, for example in a one-gang, two-gang, or multi-gang electrical box. In one embodiment, a more minimal system similar to device (204) with at least an audio input device (206), a toggle (208), and a network interface (116) are mounted in the electrical box for wall/ceiling/floor mount, and a hub coupled on another end of network interface (116) provide the processing (102) and memory (110) for complex natural language processing. In one embodiment, the physical control also includes a context indicator (208) such as a multicolor LED. The device (204) may control subsystems within a room housing the device (204), or control presets involving a plurality of rooms in the home. For example, the device (204) may control music that would play in the living room, kitchen and bedroom.

Figure 3:
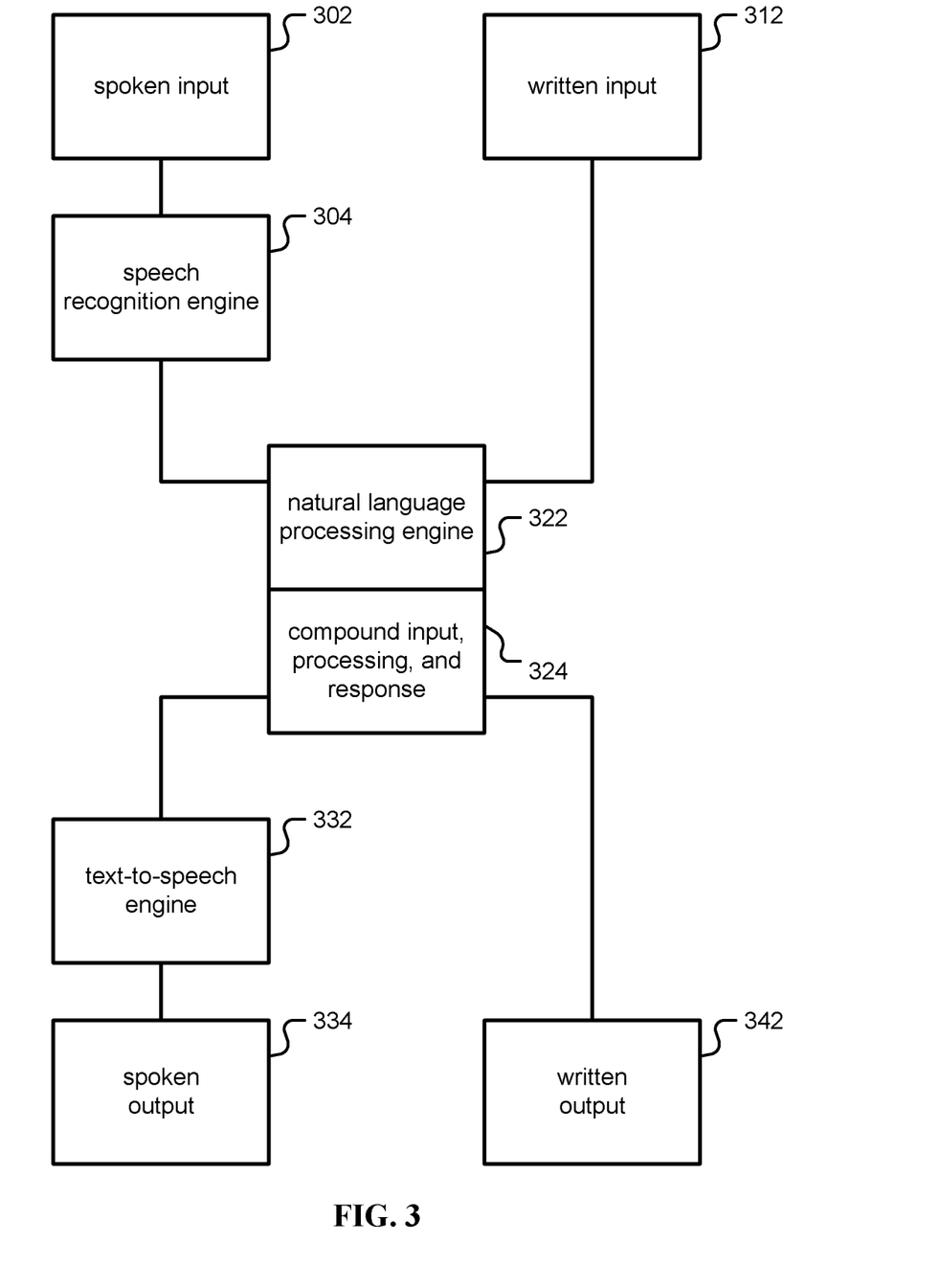
FIG. 3 is a block diagram illustrating an embodiment of a system for complex input speech and written processing.

FIG. 3 is a block diagram illustrating an embodiment of a system for complex input speech and written processing. In one embodiment, the system of FIG. 3 is carried out by the processor (102) and memory (110) of FIG. 2.

As FIG. 3 illustrates, input may be spoken and/or written, and output may be spoken and/or written. Spoken input (302) is processed by a speech recognition engine (304) before being passed to the natural language processing engine (322). This engine (322) may reside locally in device (204), a hub in the home, or be in a cloud-based system coupled by the Internet. Written input (312), for example through an auxiliary smartphone/tablet/computer app, may be processed directly by the natural language processing engine (322). Note that in some cases, the written input (312) may have little or no punctuation, capitalization, and/or proper nouns recognized. Natural language processing engine (322) applies rules and couples the system for complex/compound input, processing, and response (324). User notification of responses includes written output (342) from system (324), and may include a text-to-speech engine (332) to provide spoken output (334) as well.

In one embodiment, the system of FIG. 2 has no complex input speech and written processing and is without the system of FIG. 3. For example, a toggle (208) starts by controlling lights, and through an auxiliary motion, for example pulling the toggle, control is transferred from controlling lights to controlling music. Another auxiliary motion may transfer control to shades, TV, thermostat, and so forth.

State being informed by current context. In one embodiment, the state of the contextual home automation device is informed by its current context. For example, in a room with lights set to 50%, "turn it up" is likely referring to lights and so state is for lighting. For the same device, if music is playing and lights are at 100%, "turn it up" is going to control music volume and state is for music volume control, in part because the lights cannot be turned up further.

Conditional programming to dynamically set toggle. In one embodiment, conditional programming dynamically sets what the toggle does. For example, if the current time is between 5 am-9 am, a toggle controls shades by default, and if the current time is between 9 am-5 pm, the same toggle controls lights by default, and if the current time is between 5 pm-10 pm, the same toggle controls music volume by default, and if the current time is between 10 pm-5 am, the same toggle controls lights. Another example is a "weather conditional" where if the current weather is considered "sunny", a toggle controls shades, and otherwise the same toggle controls lights. Without limitation, conditionals may be based on any event, including time of day, weather, current events, politics, sports, news, sales volumes, national epidemic events, public health events, global pandemic events, entertainment events, traffic events, war events, holiday events, audience response events, and seasonal events.

Figure 4A:
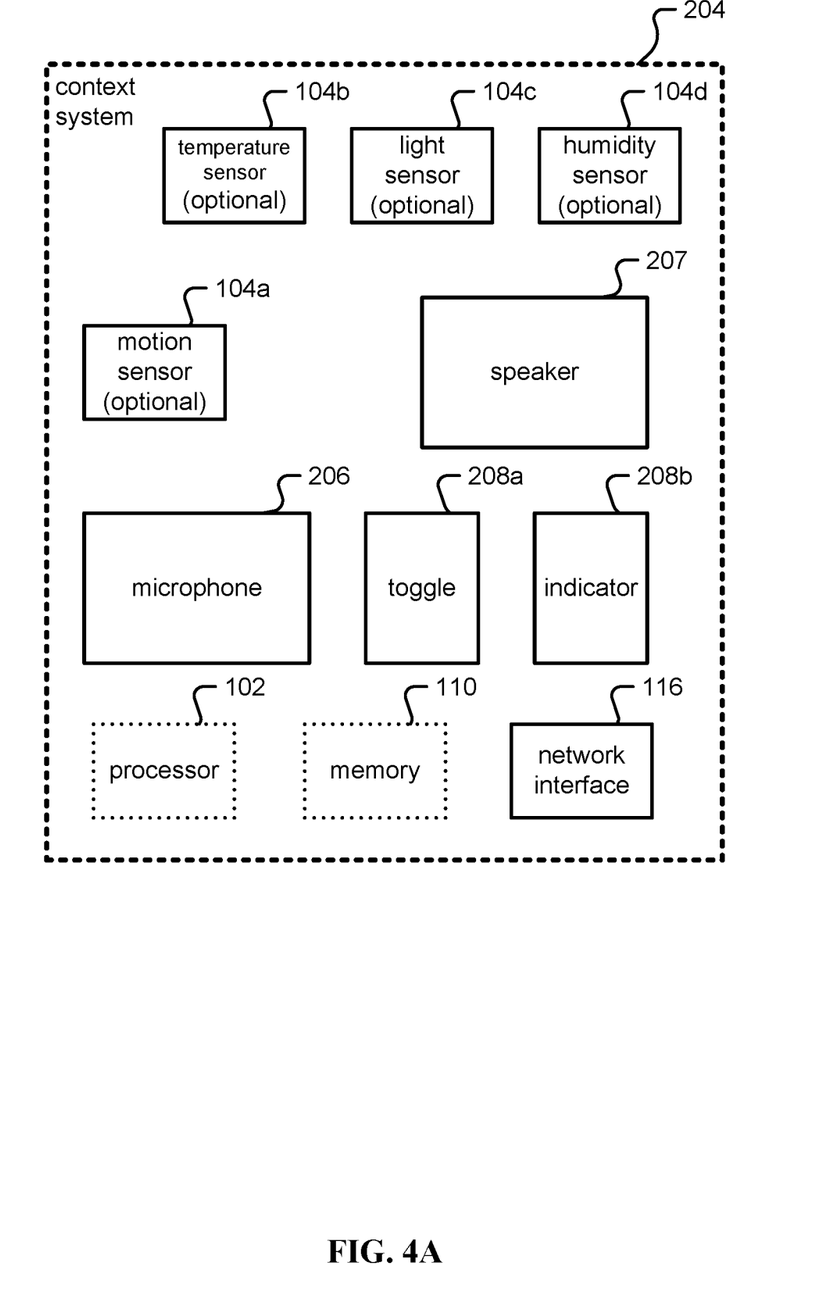
FIG. 4A is a block diagram illustrating an embodiment of a system for a contextual home automation device.

FIG. 4A is a block diagram illustrating an embodiment of a system for a contextual home automation device. In one embodiment, the system of FIG. 4A is the device (204) of FIG. 2. Contextual home automation device (204) minimally includes at least a microphone (206), a toggle (208a), and either a processor (102)/memory (110) or network interface (116). In one embodiment, contextual home automation device (204) comprises a motion sensor (104a), temperature sensor (104b), light sensor (104c), humidity sensor (104d), an indicator (208b) such as one or more multicolor LEDs, and/or speaker (207)

In one embodiment, the toggle (208a) is also used to 'awaken' speech input, for example by tapping once, and 'mute' speech input, for example by tapping twice. In one embodiment, the toggle (208a) may be user configurable. For example, the button (208a) may toggle lights on and off, toggle shades open and close, and so forth, in a user configurable manner where lights on may be "up" for some users and "down" for other users. In one embodiment, the toggle (208a) has multiple positions where for example left and right controls light brightness, and up and down controls turn lights on/off. In that way if lights are set to 20%, a user may turn them on/off without losing the brightness they want to return to. The toggle (208a) may turn the TV on/off, locks, shades open/close, or activate a scene such as "turn everything in the room/house on or off", but still preserve any gradient settings achieved previously.

In one embodiment, environmental sensors (104) and/or other sensors are also used to either awaken speech input and/or provide a current context for device (204). In one embodiment, microphone and/or a microphone array (206) are part of the contextual system (204). An array may be used, for example, to improve directional audio input, use beamforming techniques, and/or enhance noise cancellation. The array may utilize a digital signal processor (DSP) in the device itself (204) or using a remote processor (102) in the hub, for example. The microphone (206) coupled with a processor (102) and/or memory (110), either locally or remotely through network interface (116) is used to provide a current context for the device (204). The device (204) may provide audio feedback to speech input by way of a speaker and/or speaker array (207). In one embodiment, the microphone/microphone array (206) is configured to accept a verbal input, wherein a processor (102), either locally or remotely through network interface (116), is further configured to determine a current context based at least in part on a natural language phrase from the verbal input.

For example, a user may utter "Josh, turn on the lights". The term "Josh" is a "wake word" to indicate that the user is speaking to the device (204). An alternative to using a wake word is a user tapping a portion of toggle (208a), or the motion sensor (104a) sensing a user just entered a room. The system may indicate through the speaker (207) "Ok, I'll turn on the lights" or "Ok, let's control lighting." In one embodiment, a computing device such as a computer, phone, and/or tablet may also provide feedback, for example when playing an artist it may show album art.

For example, the phrase "turn on the lights" may allow the device to switch on lights, and indicates the current context for the device (204) as a dimming switch, and this current context may be adapted for contextual input system (208a), (208b). After the phrase "turn on the lights" is uttered by the user, establishing its current context as "lighting", the toggle (208a) acts as an on/off and/or dimmer switch. For devices (204) with an indicator (208b), the indicator (208b) may turn yellow to indicate its current context as a lighting/dimmer switch, and set the current and/or default setting for dimness to the current position for toggle (208a) mechanism that retains positional state, for example a dial mechanism. The user may then assert the toggle (208a) to increase or reduce the brightness of the lights. To continue the example, the same user may subsequently utter "Josh, turn on CNN" which may be associated both with turning on the television and/or setting the television channel to CNN, and subsequently setting a current context with "volume level of television set in the same zone/room". The indicator (208b) may turn orange to indicate "television volume control" and no longer reflect a control on dimming, which was yellow. The user may then assert the same toggle (208a) to increase or reduce the volume of the television.

Figure 4B:
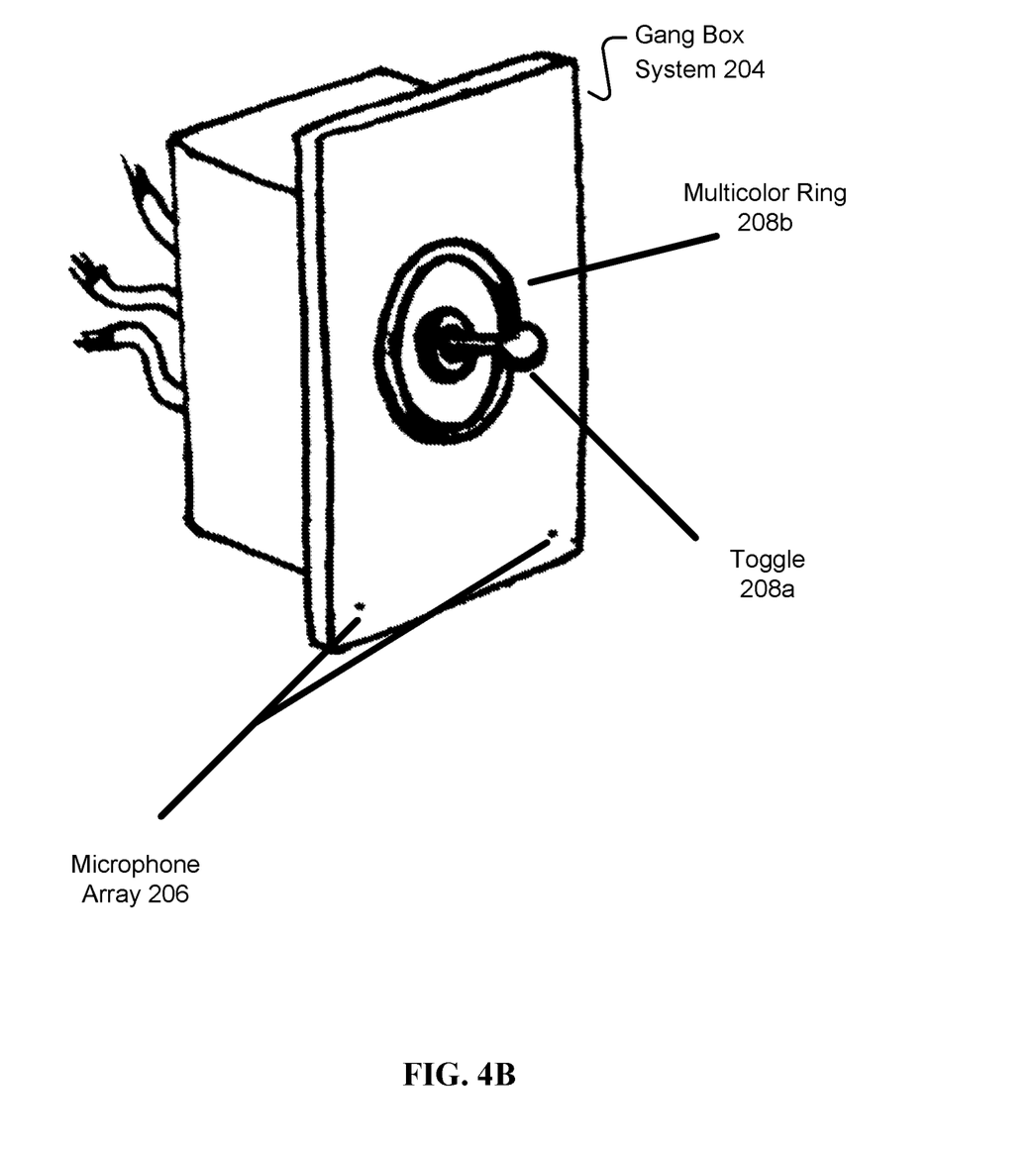
FIG. 4B is an illustration of an example embodiment of the contextual home automation toggle system with a lever-style toggle.

FIG. 4B is an illustration of an example embodiment of the contextual home automation toggle system with a lever-style toggle. In the example of FIG. 4B, the device (204) is meant to install in a one-gang box system, for example in the same form factor as typically used for a residential light switch. Two or more microphones (206) provide a microphone array for the device (204), and a momentary lever switch toggle (208a) is used with a multicolor LED ring (208b).

With the lever-style toggle of FIG. 4B, a user may contextualize the system to control the lights using a natural language verbal command and/or text input, for example via an app, where the system responds by lighting the ring (208b) yellow to indicate "lighting", wherein color assignment is user and/or factory settable. Then tapping the momentary lever (208a) down turns lights off, while tapping the momentary lever (208a) up turns lights on. Holding the momentary lever (208a) up or down while the lights are on may respectively brighten or dim the lights.

Another possible contextualization would be if the user gives a music input using a natural language verbal command and/or text input, where the system responds by lighting the ring (208b) magenta to indicate "music". Under the music context, a tap down on lever (208a) may indicate "pause music", a tap up "continue music", hold up "increase volume", and hold down "decrease volume".

The exterior wall surface of the device (204) may be many materials to fit in with a residence including metal, plastic, and glass. The box by fitting into the wall hole/gang box may be powered by residential power, for example 110-120V in the USA. The momentary toggle switch (208a) as shown in FIG. 4B would return to center after being pressed and/or tapped. It may be pressed and/or held in two or more directions.

The multicolor LED ring (208b) provides visual feedback for the contextual command, progress, and/or the subsystem command. An example would be a 256 color RGB LED ring. For example, the ring (208b) may animate, for example provide a rotating rainbow pattern between the time the system detects a user's speech until the time the system determines a user has provided a context such as "lighting". The LED ring (208b) may then light yellow for "lighting". If the user then holds the lever (208a) up or down, the ring may clear black and then establish a pattern to meter a continuous setting, such that they display a percentage brightness of the dimmable lights such that 0% is all black and 100% is all yellow, for example using a 180 degree or 360 degree setting.

In one embodiment, a hardwire fallback wiring for the device (204) is to provide a lighting switch similar to that of a traditional dimmer switch. The firmware for a basic processing unit on device (204) receives packets associated with the contextualization command, and if the network associated with network interface (116) is available submits the packets to the remote processor (102)/memory (110). A hardwired fallback If the remote processor (102) then indicates the context is "lighting" the system controls the lighting subsystem, otherwise if the context is other than lighting the corresponding home automation subsystem is controlled by the home automation system such as using a home automation hub. On the other hand, if the network (116) is not available and/or a local processor (102) is not able to process the contextualization command, the hardwire fallback wiring is used and the device (204) acts as a traditional dimmer switch.

Commands available for toggle switch (208a) include:
- Tap up: Binary contextual command like lights on, or shades open;
- Tap down: Binary contextual command like lights off, or shades closed;
- Hold up: Gradient contextual command like music louder or lights brighter;
- Hold down: Gradient contextual command like music lower or lights dimmer;
- Voice and/or App command—sets contextualization mode for a period. It may after the period go back to a default (for example, lights); and
- LEDs (208b)—light up to the color of command, which is user configurable but may default for example to yellow for lights, magenta for music, and so forth.

The switch may be a toggle or a button or a series of toggles or buttons. The face plate may be multiple colors and materials, square, or rounded corners. It may fit in a standard single gang electrical switch box or a standard double gang electrical switch box. It may mount to a wall in the switch box or may be surface mounted with a stylish box. Microphones may be embedded in switch, and the system also has the capability to couple with external microphones via wired and/or wireless coupling. The processor may be embedded in switch, and the system also has the capability to network with external processors via wired networking and/or wireless networking.

A switch may default to controlling lights via a hard wire connection. This default behavior is user configurable, and/or may be programmed to bypass and send a signal to a processor for controlling other device types. When the device loses one or more connections it may default back to a hardwire light connection.

Figure 4C:
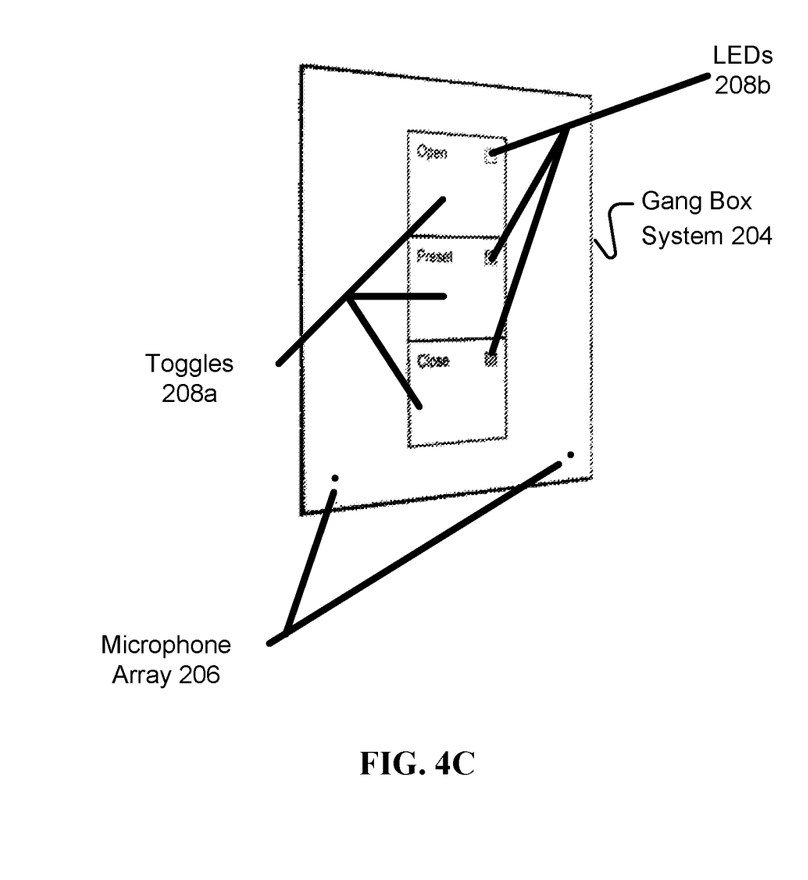
FIG. 4C is an illustration of an example embodiment of the contextual home automation toggle system with a button-style toggle.

FIG. 4C is an illustration of an example embodiment of the contextual home automation toggle system with a button-style toggle. In the example of FIG. 4C, the device (204) is meant to install in a two-gang box system, for example in the same form factor as typically used for two residential light switches. Two or more microphones (206) provide a microphone array for the device (204), and a set of three button switch toggles (208a) is used with a set of three multicolor LED (208b) for each button switch.

When using button switches, dynamically contextualized commands may be initiated using a single tap of a button, a double tap of a button, and/or a long tap/hold. For example, under a lighting context with three buttons as shown in FIG. 4C, tapping the middle button may rotate through various scenes. A single tap of the top button may be a "lights on" discrete command, a long tap of the top button may be a "brighten lights more" continuous command, a long tap of the bottom button may be a "dim lights more" continuous command, and a single tap of the bottom button may be a "lights off" discrete command.

Figure 5:
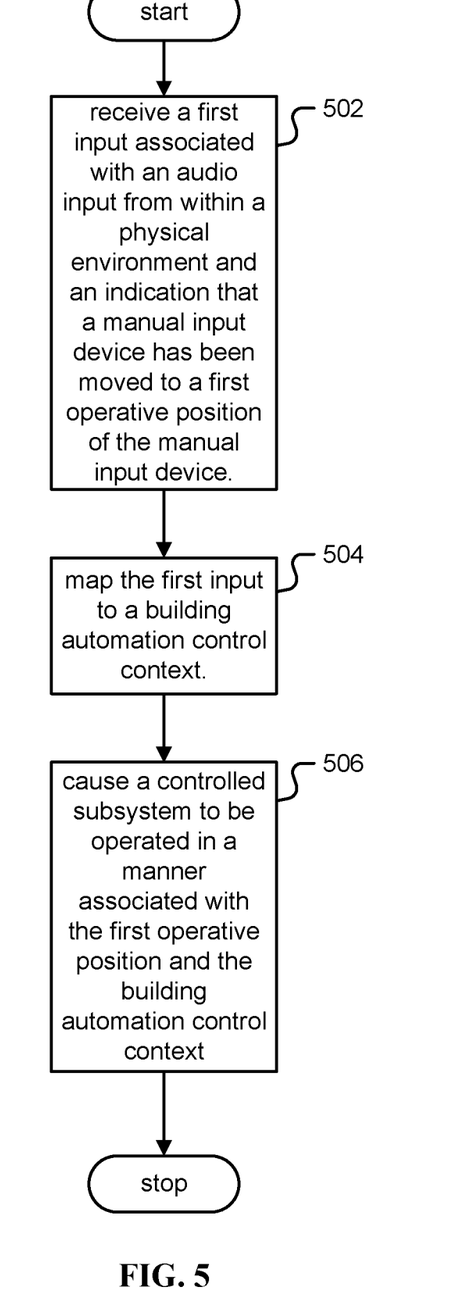
FIG. 5 is a flow chart illustrating an embodiment of a process for contextual home automation.

FIG. 5 is a flow chart illustrating an embodiment of a process for contextual home automation. In one embodiment, the process of FIG. 5 is carried out by the system of FIG. 1 and/or FIG. 2.

In step 502, a first input associated with an audio input from within a physical environment is received and an indication that a manual input device has been moved to a first operative position of the manual input device is received. For example, in FIG. 4A the audio input may be received via one or more microphones (206) and the manual input device may be a toggle (208a), where the first operative position may be an up position with a lever toggle as shown in FIG. 4B or a push with a button toggle as shown in FIG. 4C.

In step 504, the first input is mapped to a building automation control context. For example, if the audio input was determined to control a lighting subsystem, this would be the building automation control context. In one embodiment, a building automation control context includes at least one of the following: lighting, shades, temperature, heating, cooling, audio, video, multimedia, entertainment, music, television, radio, streaming, movies, thermostat, fan, fireplace, garage door, fountain, and binary devices. In one embodiment, the building automation control context can simultaneously control two different subsystems.

In step 506, a controlled subsystem is caused to be operated in a manner associated with the first operative position and the building automation control context. For example, if the building automation control context is lighting and the first operative position is up, then the controlled lighting subsystem may be caused to turn on the lights.

In one embodiment, an indication is received that the manual input device has been moved to the first operative position in a transient movement the manner associated with the first operative position is discrete. This may be helpful for discrete commands such as "lights on" or "lights off".

In one embodiment, an indication is received that the manual input device has been moved to the first operative position in a continuous movement the manner associated with the first operative position is continuous. This may be helpful for continuous commands such as "lights brighter" or "lights dimmer".

In one embodiment, the LED ring: displays a rotational motion while the processor determines the building automation control context after the audio input is received by the microphone; displays a different color representing different controlled subsystems; and/or illuminates a percentage of 180 degrees or 360 degrees corresponding to a current level of a controlled parameter associated with a current controlled subsystem.

In one embodiment, the microphone, the manual input, and the processor fit within a gang box form factor. In one embodiment, a plurality of manual input devices may be used, such as the buttons in FIG. 4C. In one embodiment, the controlled subsystem is hard wired to a default controlled subsystem such as lighting.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
a microphone configured to receive audio input from within a physical environment in which the device is located and provide an electrical output representative of said audio input; and
a manual input device having at least a neutral position and a first operative position;
wherein the microphone output is coupled to a processor configured to:
determine a building automation control context based at least in part on a natural language analysis of the microphone output;
display a color on the device representing the determined building automation control context; and
receive an indication that the manual input device has been moved to the first operative position and to subsequently cause a controlled subsystem to be operated in a manner associated with the first operative position and the determined building automation control context.

2. The device of claim 1, wherein the device further comprises the processor.

3. The device of claim 1, wherein the processor is remote from the device.

4. The device of claim 1, wherein the processor is in a building automation hub remote from the device.

5. The device of claim 1, wherein:
the microphone output is associated with a first audible command and the building automation control context is a first building automation control context and controlled subsystem is first controlled subsystem;
the processor is further configured to associate second microphone output associated with second audible command with a second building automation control context; and
the processor is further configured to, in response to indication that the manual input device has been moved to the first operative position to cause a second controlled subsystem to be operated in a manner associated with the first operative position and the second building automation control context.

6. The device of claim 1, wherein the building automation control context is associated with at least one of the following controlled subsystems: lighting, shades, temperature, heating, cooling, audio, video, multimedia, entertainment, music, television, radio, streaming, movies, thermostat, fan, fireplace, garage door, fountain, and binary devices.

7. The device of claim 1, wherein the building automation control context is associated with simultaneously two of the following controlled subsystems: lighting, shades, temperature, heating, cooling, audio, video, multimedia, entertainment, music, television, radio, streaming, movies, thermostat, fan, fireplace, garage door, fountain, and binary devices.

8. The device of claim 1, wherein the manual input device is at least one of the following: a toggle, a push button, and a mechanical device.

9. The device of claim 1, wherein the manual input device has a center position as the neutral position and is spring loaded to return to the neutral position.

10. The device of claim 9, wherein the manual input device has a second operative position.

11. The device of claim 10, wherein the first operative position is a toggle-up position and the second operative position is a toggle-down position.

12. The device of claim 9, wherein the processor receives an indication that the manual input device has been moved to the first operative position in a transient movement the manner associated with the first operative position is discrete.

13. The device of claim 9, wherein the processor receives an indication that the manual input device has been moved to the first operative position in a continuous movement the manner associated with the first operative position is continuous.

14. The device of claim 1, wherein the device further comprises an LED (light emitting diode) ring.

15. The device of claim 14, wherein the LED ring:
displays a rotational motion while the processor determines the building automation control context after the audio input is received by the microphone;
displays a different color representing different controlled subsystems; and
illuminates a percentage of 180 degrees or 360 degrees corresponding to a current level of a controlled parameter associated with a current controlled subsystem.

16. The device of claim 1, wherein the microphone, the manual input, and the processor fit within a gang box form factor.

17. The device of claim 1, further comprising a second manual input device, wherein the manual input device is a first manual input device.

18. The device of claim 1, wherein the controlled subsystem is hard wired to a default controlled subsystem.

19. A system, comprising:
a communication interface configured to receive a first input associated with an audio input from within a physical environment and an indication that a manual input device has been moved to a first operative position of the manual input device; and
a processor coupled to the communication interface and configured to:
determine a building automation control context based at least in part on a natural language analysis of the first input;
display a color representing the determined building automation control context; and
subsequently cause a controlled subsystem to be operated in a manner associated with the first operative position and the determined building automation control context.

20. A method, comprising:
receiving a first input associated with an audio input from within a physical environment and an indication that a manual input device has been moved to a first operative position of the manual input device; and
determining a building automation control context based at least in part on a natural language analysis of the first input;
indicate a color representing the determined building automation control context; and
subsequently causing a controlled subsystem to be operated in a manner associated with the first operative position and the determined building automation control context.

* * * * *